UNITED STATES PATENT OFFICE.

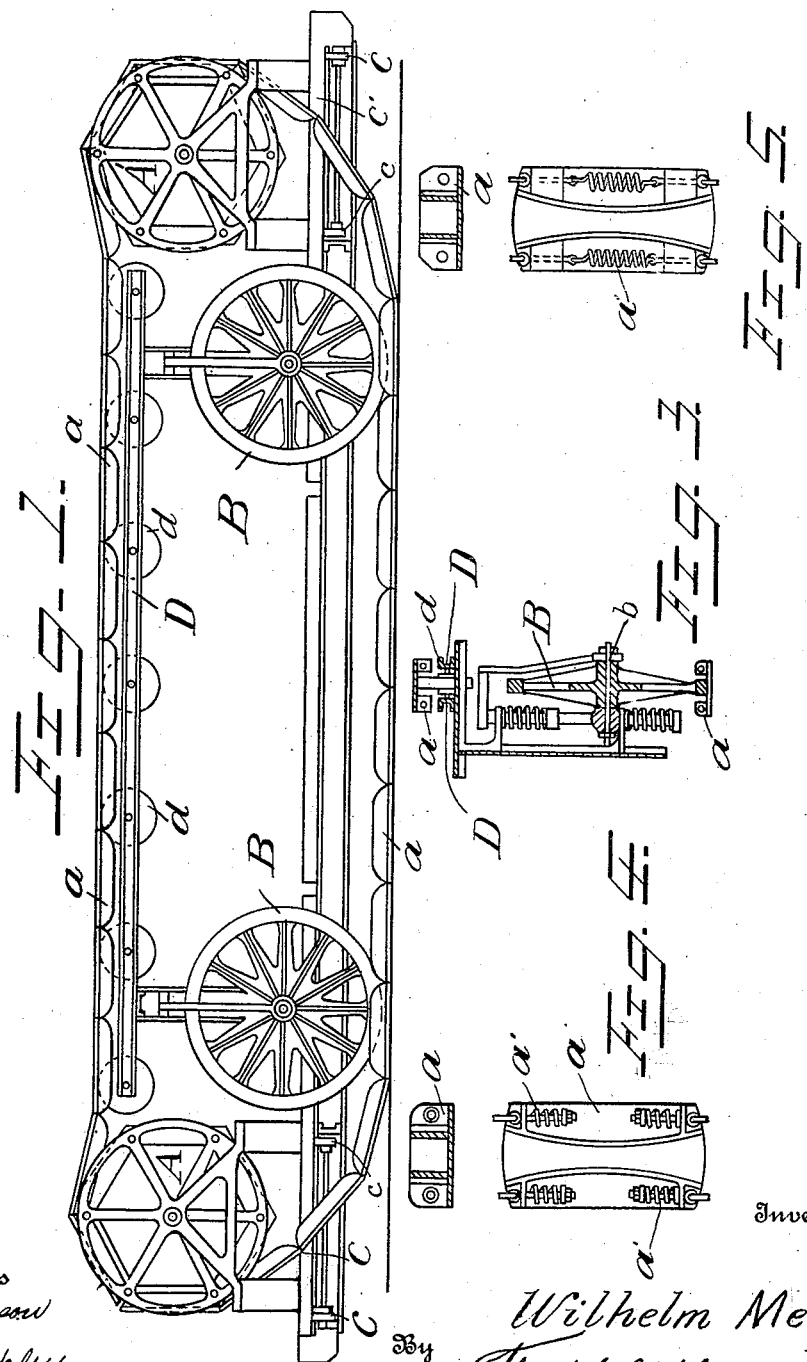

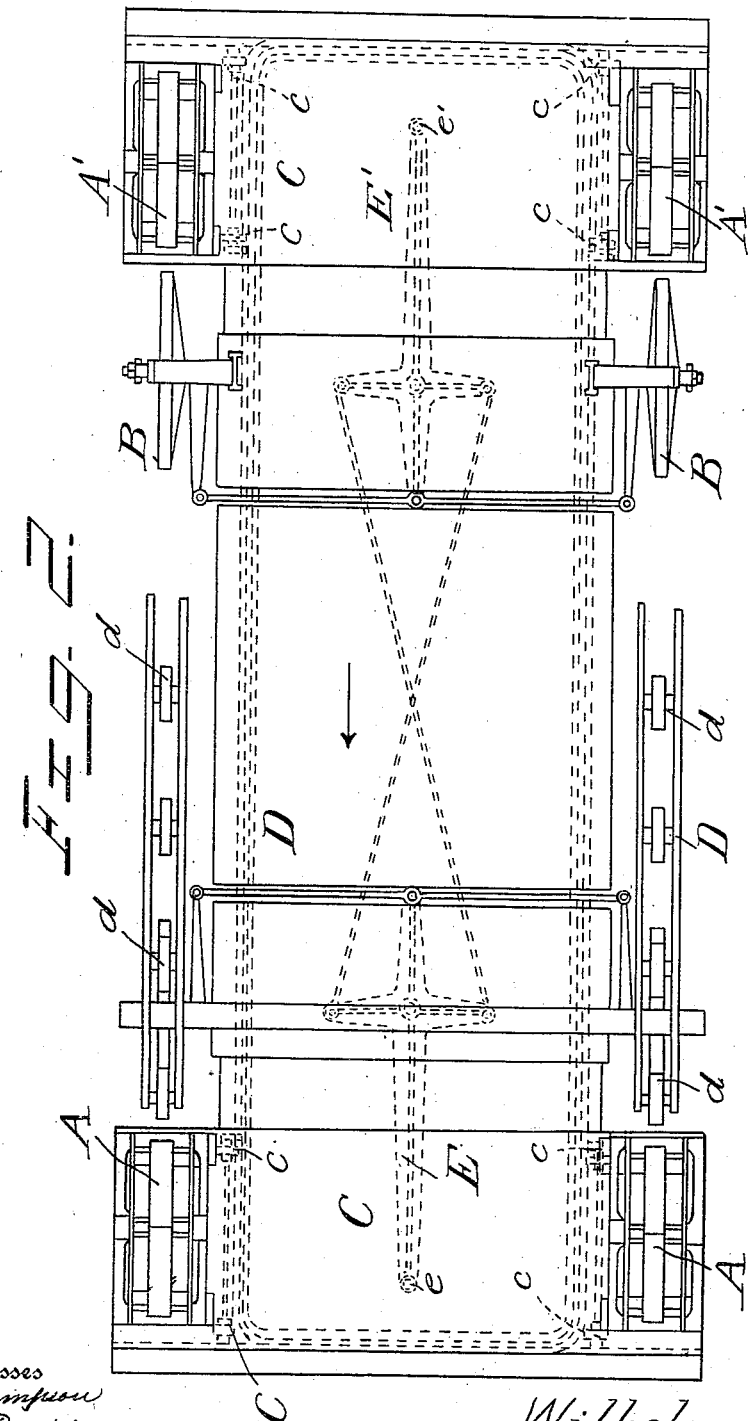

WILHELM MEIER, OF WÜRENLINGEN, SWITZERLAND.

VEHICLE WITH PORTABLE RAILS.

1,069,159.      Specification of Letters Patent.      Patented Aug. 5, 1913.

Application filed January 9, 1909, Serial No. 471,449. Renewed December 27, 1912. Serial No. 738,969.

*To all whom it may concern:*

Be it known that I, WILHELM MEIER, a citizen of the Swiss Federation, residing at Würenlingen, Aargau, Switzerland, have invented certain new and useful Improvements in Vehicles with Portable Rails, of which the following is a specification.

This invention relates to a vehicle with movable rails and in the accompanying drawings a construction embodying the invention is shown as an example.

Figure 1 is a side view of the carriage. Fig. 2 a plan of the carriage without rails and guide rollers and with the steering arrangement illustrated; Fig. 3 a vertical section through the wheel of Fig. 1; Fig. 4 a plan and cross section of a rail segment; and Fig. 5 a longitudinal and cross section of a different rail section.

The carriage shown is provided at the front and back with rail transport wheels $A$, $A^1$ for the rail segments $a$, which are connected together by spring connections $a^1$ to form an endless flexible chain. The rail segments according to Fig. 4 consist entirely of iron, while those according to Fig. 5 have a wooden holder for the spiral springs serving for the spring connection $a^1$. The rail chain is carried at the top on rollers $d$ having bearings in the beams D. The rail sections form grooves in which the carriage wheels B rotate. Fig. 3 shows how the bottom of the carriage with the supporting beam D is supported through springs on the carriage axle $b$.

By means of an arrangement not illustrated the movable carriage parts C and $C^1$, which carry the rail laying wheels A, $A^1$, can be displaced to either side for steering purposes, these parts resting on rollers $c$ on the vehicle frame. The cross arms E, $E^1$ connected together as shown, can be attached at $e$ and $e^1$ to the carriage parts C, $C^1$ by means of bolts. If the vehicle is traveling forward and has to take a curve, the back bolt at $e^1$ is released. By displacing the part C of the carriage toward the side in which it is desired to travel, the cross arm E connected therewith turns and the rail sections are laid according to the desired curve and the vehicle wheels B so turned that they run in this curve.

What I claim as my invention and desire to secure by Letters Patent is:—

1. In a vehicle with portable endless rails, rail laying mechanism at each end of the vehicle, a supporting carriage for the said mechanism at each end, means for mounting the supporting carriages upon the vehicle frame to permit of transverse movement, pivoted cross arms under the vehicle frame connected at their extremities to the carriages and cross connections between the arms to effect simultaneous traversing of the supporting carriages for steering purposes.

2. A vehicle of the class described, comprising track-laying mechanism at the ends of the vehicle, an endless sectional track laid by said mechanism, vehicle carrying wheels and their axles, a frame including beams, rollers having their bearings upon said beams, and means for resiliently supporting said frame in position from said axles.

3. A vehicle of the character described, comprising track-laying means at the ends of the vehicle, an endless sectional track engaged by said track-laying means, the sections of said track being rounded laterally at their ends, means effecting connection between said track-sections and resilient braces applied to said means of connection and delivering pressure to said track sections.

4. A vehicle of the character described comprising track-laying means, an endless sectional track mounted on said track-laying means, slidable members connecting said track sections together, and elastic means coöperating with said slidable members to hold said track sections in a relatively normal position.

5. A vehicle of the character described, comprising track-laying means at the ends of said vehicle, transporting wheels for said vehicle, an endless sectional track engaged by said track-laying means, rods having slidable connection with the sections of said tracks and springs applied to said rods for resiliently connecting together said track-sections.

6. In a vehicle of the character described, track laying means, a track mounted on said track laying means, sections comprising said track, and channels carried by said sections, said channels being open relatively wide at their entrances, the sides of said channels being bent in toward each other intermediate the entrances to said channels.

7. In a vehicle of the character described, track laying means, a track mounted on said track laying means, sections comprising said track, means for connecting said sections together, and rounded ends carried by said sections, contiguous ends of adjoining sections being oppositely rounded whereby the rounding of a curve by said vehicle will be facilitated.

8. In a wheeled vehicle of the character described, track laying means, a track mounted on said track laying means, sections comprising said track, means for connecting said sections together, wheel channels carried by said sections, said channels being relatively wider at their ends or entrances, and rounded ends carried by said sections, contiguous ends of adjoining sections being oppositely rounded whereby the rounding of a curve by said vehicle will be facilitated and the relatively wide entrances of said channels will insure said transport wheels entering said channels.

9. In a vehicle of the character described, rail laying mechanism, an endless track mounted on said rail laying mechanism, transversely movable supporting carriages for said rail laying mechanism, and rollers on which said supporting carriages bear to facilitate their transverse movement with respect to said vehicle.

10. In a vehicle of the character described, vehicle carrying wheels and their axles, a frame including beams, rollers having their bearings upon said beams, means for resiliently supporting said frame in position from said axle, track laying means carried by said frame, an endless sectional track laid by said track laying means, elastic means for normally maintaining the sections of said track in their relative positions, and channels carried by said sections, said channels being open relatively wide at their entrances, the sides of said channels being bent in toward each other intermediate the entrances to said channels.

11. In a vehicle of the character described, carriages positioned contiguous the ends of said vehicle, means for mounting said carriages upon said vehicle to permit of transverse movement, track laying means supported by said carriages, an endless sectional track laid by said track laying means, elastic means for normally maintaining the sections of said track in their relative positions, channels carried by said sections, said channels being open relatively wide at their entrances, the sides of said channels being bent in toward each other intermediate the entrances to said channels, pivoted cross arms mounted on said vehicle, said cross arms being connected contiguous their extremities to said carriages, and cross connections between said cross arms to effect simultaneous traversing of said supporting carriages for steering purposes.

12. In a vehicle of the character described, carriages positioned contiguous each end of said vehicle, track laying means carried by said carriages, a track laid by said track laying means, means for permitting said carriages to be moved transversely of said vehicle, pivoted cross arms positioned on said vehicle body, cross connections between the transverse arms of said cross arms to effect transverse movements of said carriages for steering purposes, and means for releasably connecting said cross arms contiguous their extremities to said supporting carriages, whereby when said vehicle is in transit it can be held to follow a straight line.

13. In a vehicle of the character described, carriages positioned contiguous each end of said vehicle, track laying means carried by said carriages, a track laid by said track laying means, means for permitting said carriages to be moved transversely, cross arms pivoted to said vehicle and to said carriages, cross connections between the transverse arms of said cross arms to effect the transverse movements of said carriages for steering purposes, and means for releasing the pivotal connection of the rear cross arm with its carriage whereby the forward carriage may be swung either to one side or to the other to permit said track laying means to lay said track for the desired curve.

In witness whereof I have hereunto set my hand in the presence of two witnesses.

WILHELM MEIER.

Witnesses:
CARL MÜLLER,
JOSEPH SIMMS.

---

Copies of this patent may be obtained for five cents each, by addressing the "Commissioner of Patents, Washington, D. C."